No. 744,020. PATENTED NOV. 17, 1903.
H. Y. ARMSTRONG.
CARAMEL CUTTING AND WRAPPING MACHINE.
APPLICATION FILED DEC. 18, 1902.
NO MODEL. 6 SHEETS—SHEET 1.

Witnesses:

Inventor:
Harry Y. Armstrong
By Thomas F. Sheridan
Atty.

No. 744,020. PATENTED NOV. 17, 1903.
H. Y. ARMSTRONG.
CARAMEL CUTTING AND WRAPPING MACHINE.
APPLICATION FILED DEC. 18, 1902.
NO MODEL. 6 SHEETS—SHEET 2.

Witnesses:

Inventor:
Harry Y. Armstrong.
By Thomas F. Sheridan
Atty.

No. 744,020. PATENTED NOV. 17, 1903.
H. Y. ARMSTRONG.
CARAMEL CUTTING AND WRAPPING MACHINE.
APPLICATION FILED DEC. 18, 1902.
NO MODEL. 6 SHEETS—SHEET 4.

Witnesses:
Harold J. Barrett
Harry J. Cromer

Inventor
Harry Y. Armstrong
By Edmund F. Baldwin
Atty.

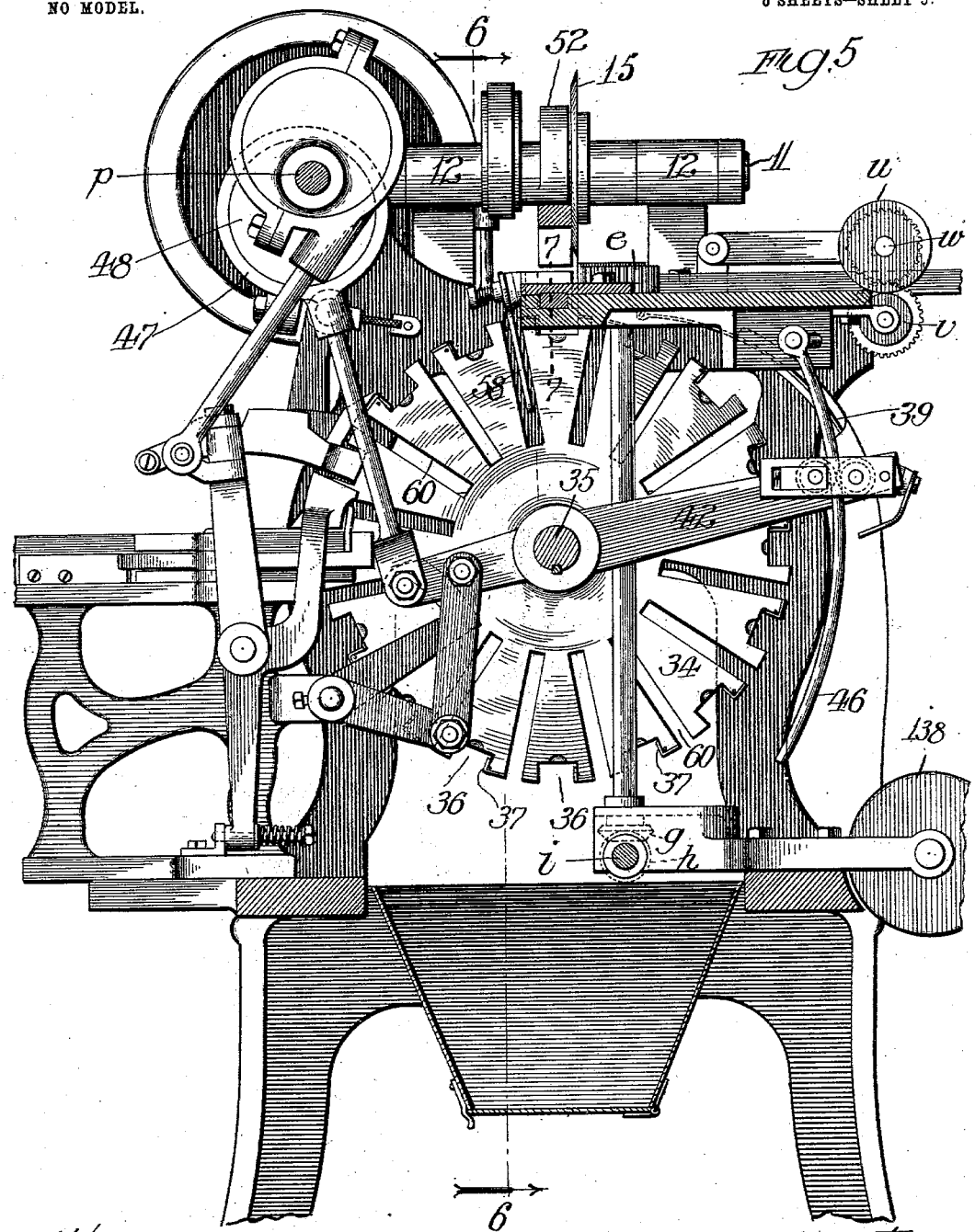

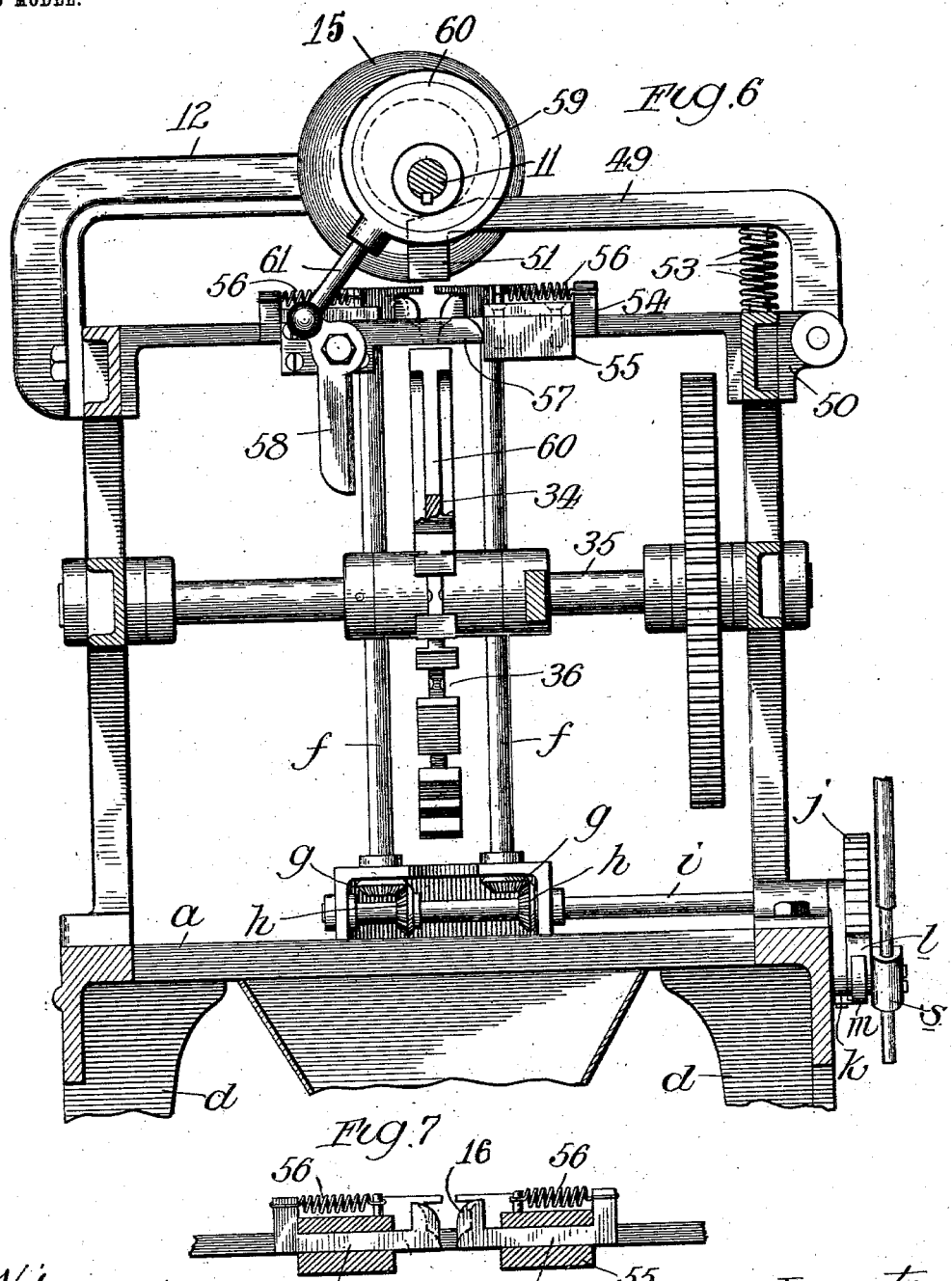

No. 744,020.　　　　　　　　　　　　　　　　Patented November 17, 1903.

UNITED STATES PATENT OFFICE.

HARRY Y. ARMSTRONG, OF ELGIN, ILLINOIS, ASSIGNOR TO FRANK M. PETERS, OF CHICAGO, ILLINOIS.

CARAMEL CUTTING AND WRAPPING MACHINE.

SPECIFICATION forming part of Letters Patent No. 744,020, dated November 17, 1903.

Application filed December 18, 1902. Serial No. 135,733. (No model.)

*To all whom it may concern:*

Be it known that I, HARRY Y. ARMSTRONG, a citizen of the United States, residing at Elgin, in the county of Kane and State of Illinois, have invented certain new and useful Improvements in Caramel Cutting and Wrapping Machines, of which the following is a specification.

The invention relates to that class of machines which is used for the purpose of receiving or taking candy-caramel strips or substances of similar plasticity, cutting them into blocks or cubes of the desired size and shape, and wrapping or folding paper around them to prepare them for shipment; and it is intended to be an improvement upon the mechanisms shown, described, and claimed in Letters Patent of the United States No. 691,737, granted to me the 28th day of January, 1902.

The principal object of the invention is to provide a simple, economical, and efficient machine for cutting a strip of candy caramel into desired cubes and wrapping paper around them to form packages for shipment.

A further object of the invention is to provide a candy-caramel and wrapping machine in as compact form and with as few parts as possible, so as to minimize the original cost of manufacture, repair, and maintenance.

Further objects of the invention will appear from an examination of the drawings and the following description and claims.

The invention consists principally in an organized machine for caramel cutting and wrapping, in which there are combined means for feeding a strip of candy into the machine, means for cutting it into cubes, a rotatable head to receive the candy cubes after they are cut, a pivoted plunger for forcing the cut cubes of candy into the rotatable head, and means for vibrating such plunger.

The invention consists, further and finally, in the features, combinations, and details of construction hereinafter described and claimed.

Figure 3:
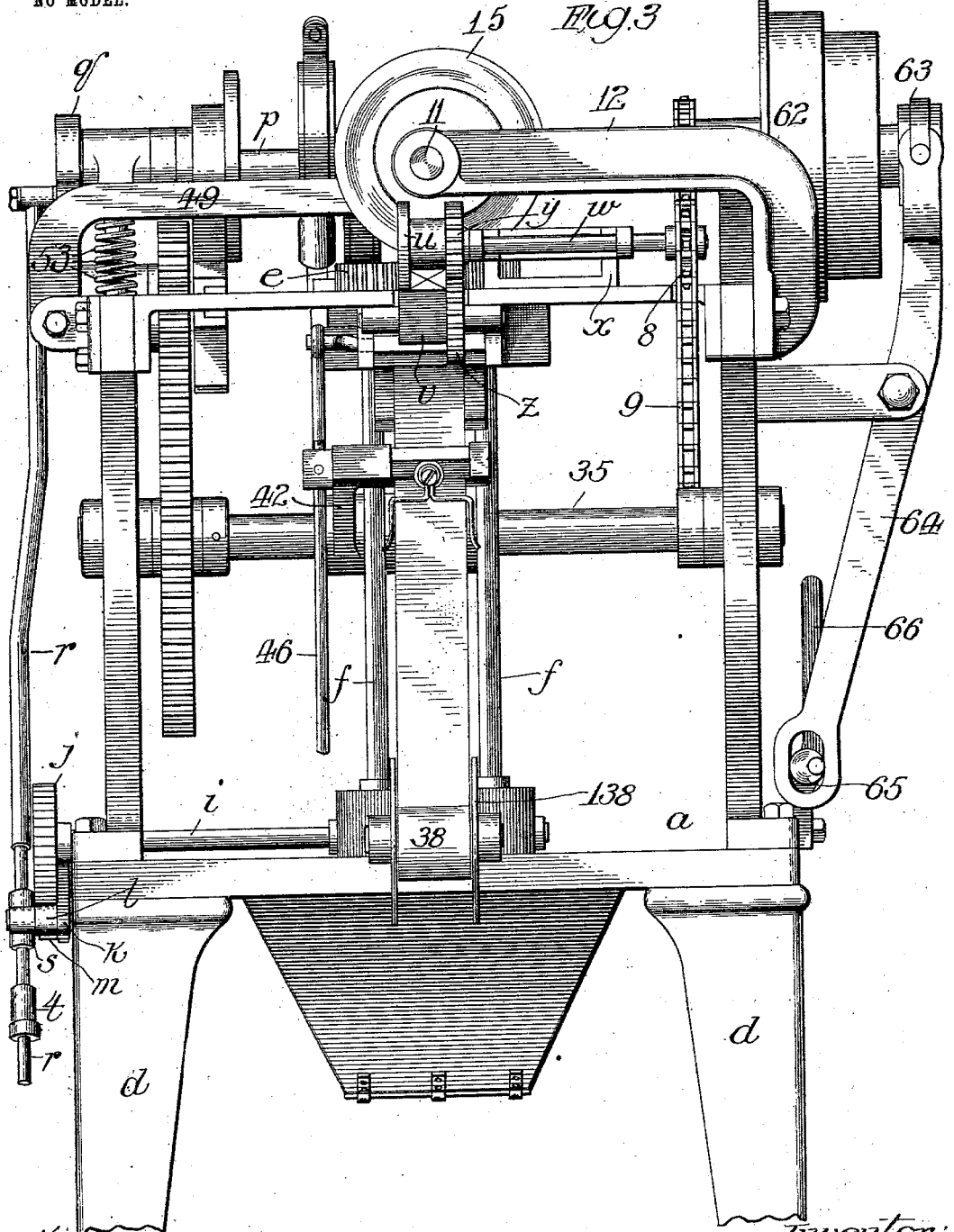
Figure 4:
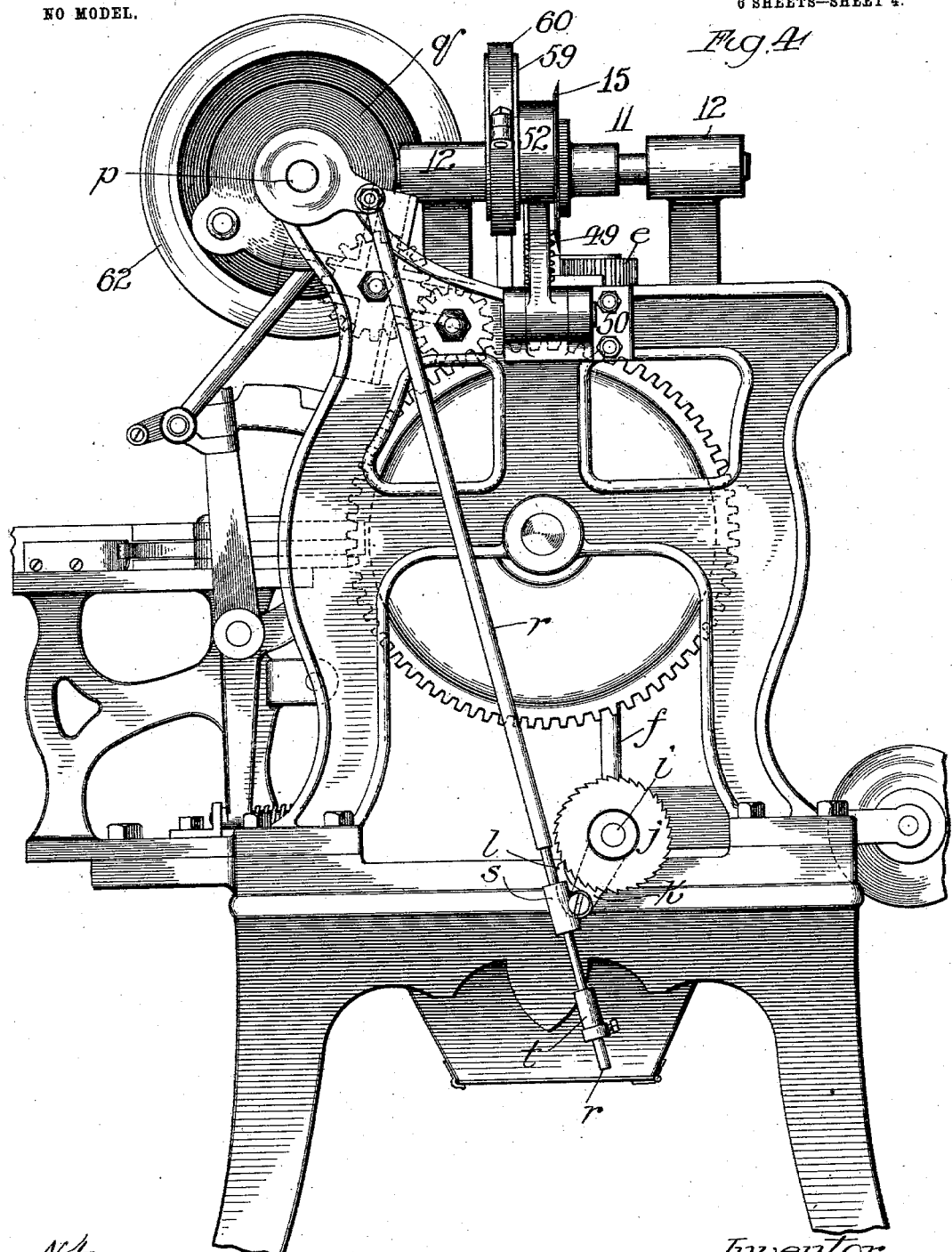

In the accompanying drawings, Figure is a front elevation of a machine constructed in accordance with these improvements; Fig. 2, a plan view of the same looking at it from above; Fig. 3, a rear elevation of the machine; Fig. 4, a side elevation of the machine looking at it from the right-hand side of Fig. 1; Fig. 5, a vertical sectional elevation taken on line 5 of Fig. 1 looking in the direction of the arrow; Fig. 6, a cross-sectional elevation taken on line 6 of Fig. 5 looking in the direction of the arrows; Fig. 7, a cross-sectional detail of the sizing mechanism taken on line 7 of Fig. 5; and Fig. 8, a plan view of the sizing mechanism looking at it from above in Figs. 2, 6, and 7.

In the art to which this invention relates it is well known that most of the mechanisms in use for cutting caramels into cubes and wrapping the same are, in order to meet modern economical conditions, automatic or semiautomatic in their nature and that as a consequence the machines for such mechanisms are very intricate, requiring large initial outlays for manufacture of the machines and further considerable outlays for necessary repairs in order to keep them in operative use.

The principle object of this invention therefore is to minimize the cost of manufacturing and maintaining this machine and to provide a simple, economical, and efficient machine which can be made as compact and of as few parts as possible, all of which will be understood and appreciated by those skilled in the art.

In illustrating and describing these improvements I have illustrated the machine completely and will so describe it; but I have not illustrated the old and well-known mechanisms in detail, and therefore do not deem it necessary to here describe them, but will refer those interested in the art to my former patent, above named, for complete detailed knowledge thereof. The mechanisms for feeding the paper into the machine and wrapping it around the caramel are substantially the same as those described in my former patent and are constructed and arranged in almost exactly the same manner.

In constructing a machine in accordance with these improvements a main supporting-frame portion is provided, comprising a bed-plate $a$, having upright pillars or standards $b$ secured thereto at each side and joined together at or near their top portion by means of a horizontal plate $c$, the bed-plate being supported upon legs $d$, all of the desired size, shape, and strength to hold the operative and other parts in position. It will be understood that in this class of machines it is desirable to first form or cut the candy into strips of the desired length and thickness, so that it can be readily fed into the machine for the purpose of being cut into cubes and wrapped in paper to form the desired sized packages. To feed the candy into the machine, a pair of indented feed-wheels e is provided and mounted upon the horizontal plate adjacent to the forward edge thereof, as shown particularly in Figs. 2, 4, and 5, so that they rotate in a horizontal plane, and provide a space between them through which the strip of candy may be passed into engagement with the operative mechanisms, hereinafter described. To drive these feed-wheels, a pair of vertically-arranged shafts f is provided of the diameter shown in Fig. 6. These feed-shafts extend downwardly through the horizontal plate to a point adjacent to the bed-plate and are provided at their lower ends with bevel-gears g, intermeshing with a second pair of bevel-gears h, mounted upon an operating-shaft i. To rotate this operating-shaft, and thereby the shafts of the feed-wheels, the outer end thereof is provided with a ratchet-wheel j, which is secured thereto. Pivotally mounted upon a pawl-lever k is a pawl l, arranged to engage the ratchet-wheel, so that as the vibratable pawl-lever is operated in one direction it moves its pawl to engage and rotate the ratchet-wheel in the same direction, and as it is vibrated in the opposite direction it permits the pawl to slide over the teeth of the ratchet-wheel. This pawl should be provided with a spring m to yieldingly hold it in engagement with the ratchet-teeth.

Figure 1:
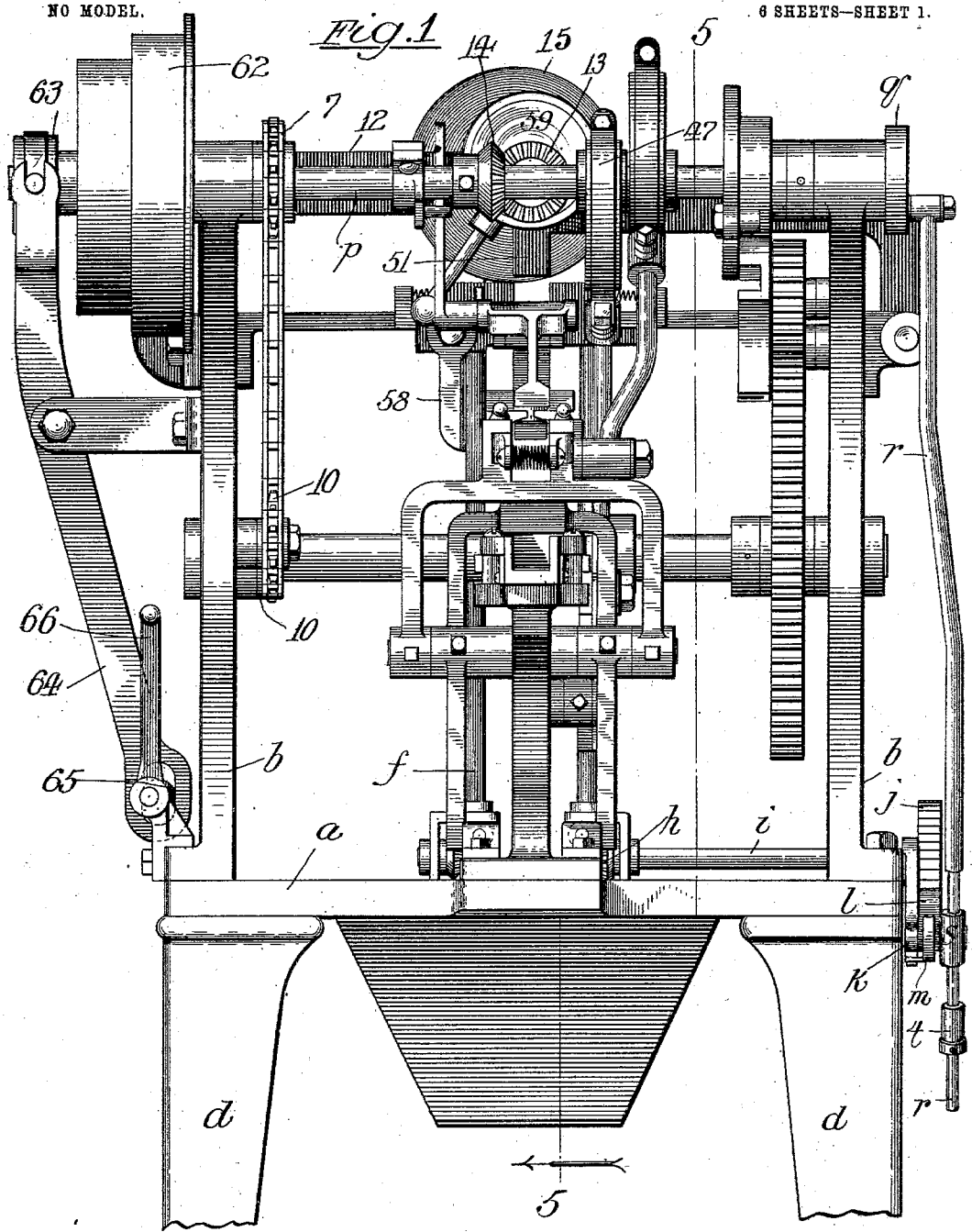
Figure 2:
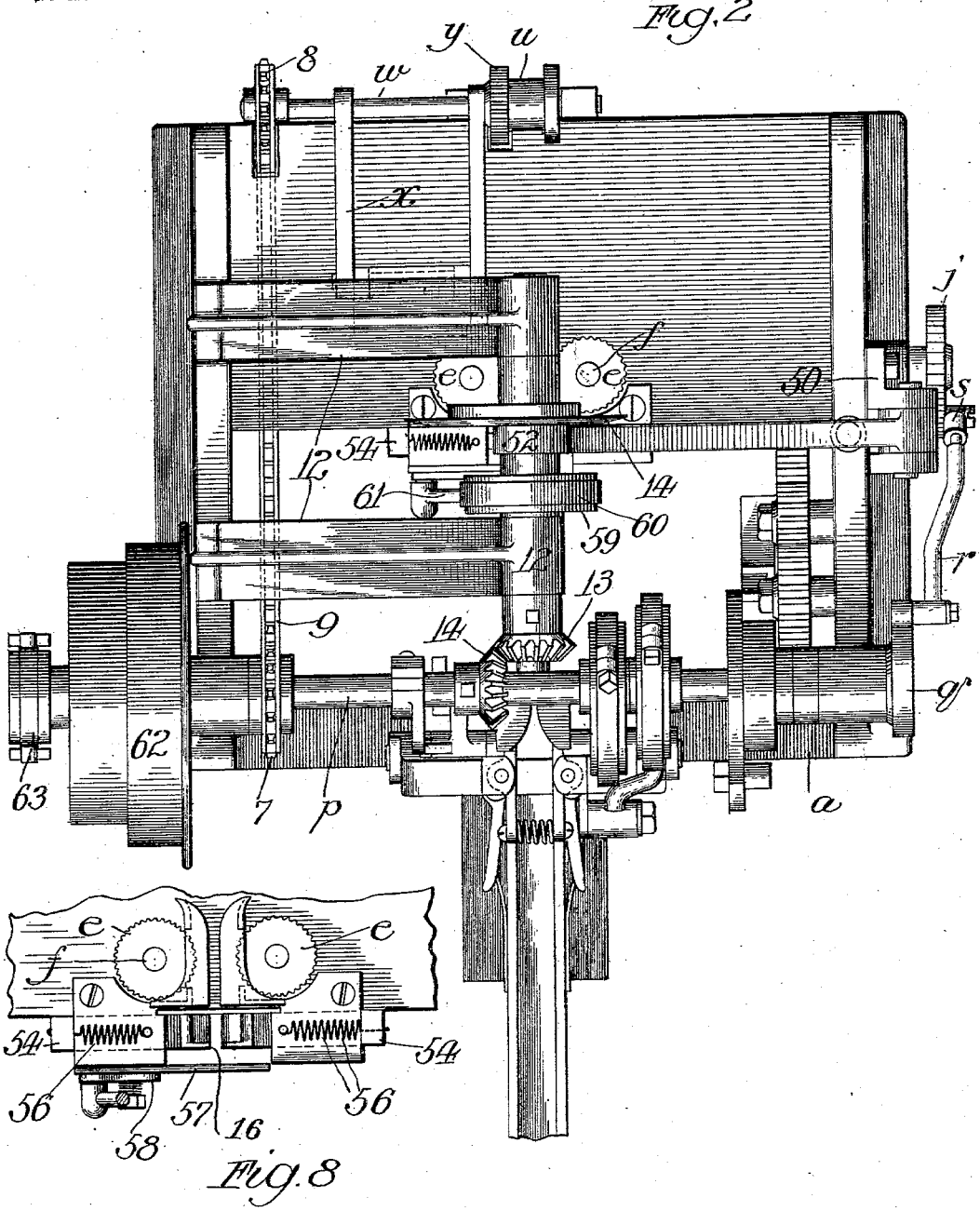

To provide for the movement and operation of the vibratable pawl-lever, ratchet, and other parts above described, a main shaft p is provided and rotatably mounted or journaled in suitable bearings at or near the upper end of the pillars and at the front portion thereof, as shown particularly in Figs. 1, 2, and 4. One end of this main shaft is provided with a crank-plate q, having a connecting-rod r vibratingly secured to a wrist-pin thereon. This connecting-rod extends downwardly and is made in two portions—a tubular upper portion and a rod or reduced portion at the lower end thereof passed through a D-shaped perforated lug or projection s on the vibratable pawl-lever. As the upper end of this connecting-rod has to rotate with the crank-plate, it will be seen that the movement imparted to the lower end will be considerably more than is required for vibrating the pawl-lever. It is therefore necessary to provide means by which only so much of the movements of the connecting-rod may be taken advantage of; hence the insertion of the rod loosely through the perforated D-shaped projection on the vibratable pawl-lever, so as to form an upper shoulder, which impinges against such D-shaped projection during one movement of the connecting-rod. A collar t is adjustably secured to the reduced portion of the connecting-rod at any desired point, so as to form a lower shoulder that will impinge against the D-shaped projection during the upward movement of such rod. From an inspection of Figs. 1 and 4 it will be seen that the position of the collar t controls the amount of motion imparted to the vibratable pawl-lever and that there is considerable loose play or motion to the connecting-rod without any corresponding motion being imparted to the vibratable pawl-lever, all of which will be understood and appreciated by those skilled in the art.

It is well known that the strips of candy fed into the machine will sooner or later become used up and that it is therefore desirable to provide means for sustaining and feeding a succeeding strip of candy into the machine before the strip being operated upon is entirely used up, and thus to save as much time as possible. To accomplish this, a pair of guiding-rolls u and v is provided, arranged to rotate one above the other in a vertical plane, the lower one being journaled in suitable bearings in the horizontal plate and the other provided with an operating-shaft w, journaled in a bracket x on such horizontal plate. Both of these rolls are provided with intermeshing gears y and z, so as to permit rotation from one to the other, and the upper roll is provided with an outer shoulder, so that, in connection with the lower roll, it forms a rectangular groove for the feeding of a strip of candy into engagement with the indented feed-rolls. To impart power and continuous motion to these rolls, the main driving-shaft is provided with a sprocket-wheel 7 and the operating-shaft of the supplementary feed-rolls with a second sprocket-wheel 8, while a sprocket-chain 9 is used to connect the same. This sprocket-wheel, as shown in Figs. 1, 2, and 3, is passed down from the sprocket on the driving-shaft underneath the horizontal plane and again up to engage the sprocket on the feed-roll-operating shaft. In order to hold the sprocket-wheel in its path of motion, a pair of idler-sprockets 10 is provided (see Fig. 1) and loosely journaled on one of the pillars, one to engage one part of the chain and the other another part and prevent them from becoming engaged or entangled with other parts of the machine.

It is now desirable to cut the candy into the desired cubes, and to accomplish this I provide a second or supplementary driving-shaft 11, journaled in suitable supporting arms or brackets 12, rigidly secured to the upper end of the upright pillars, as shown particularly in Figs. 4 and 6. The forward end of this supplementary driving-shaft is provided with a bevel-gear 13, engaging or meshing with a bevel-gear 14 on the main driving-shaft, and being of the same diameter or number of teeth the same angular velocity or number of rotations is imparted to the supplementary driving-shaft. As shown in Fig. 5, this shaft is provided with a circular cutter 15, secured thereto, so as to be rotated thereby and therewith. This circular cutter is mounted in an eccentric manner upon the supplementary driving-shaft, as shown particularly in Fig. 3, so that its cutting edge is alternately brought into and out of engagement with the strip of candy material to cut it into the desired cubes. The inward movement of the candy strip is of course accomplished by means of the indented rolls and the supplementary feeding-rolls; but it is arrested or limited by the stops 16. (Shown particularly in Fig. 8.)

After the strip of candy has been cut into the desired size cube it becomes necessary to provide holding means for advancing a piece of paper of the right size into a position adjacent to and underneath the cube of candy and between it and one of the holders, so that the candy and paper may be forced at one and the same operation into the holder to permit of the paper being folded around the candy cube. This mechanism is exactly the same as that shown and described in connection with my former patent, above named, to which reference may be had for a full and detailed description. I will say, however, that a rotatable head 34 is provided and mounted on a rotatable supporting-shaft 35, in turn rotatably mounted in suitable bearings in the pillars of the machine, as shown particularly in Figs. 5 and 6, and parallel with the main driving-shaft. This rotatable supporting-shaft is arranged to rotate in a vertical plane and directly in the path in which the candy strip travels and is provided with a plurality of holding-pockets 36, each of which is in turn arranged to be brought into position under a cube of candy, as shown particularly in Fig. 5. One of the side walls of these pockets is made yielding and of the form of a spring 37, which permits of the cube of candy, with attached piece of paper, being yieldingly held in the desired engagement, thus providing for slight differences in the size of the candy and for the easy insertion and ejection of the packages.

Describing the means for bringing the strip of paper adjacent to and underneath the cube of candy, (see Figs. 3 and 5,) a roll of paper 38 is provided and mounted in a suitable wheel 138. One end of the strip of paper is passed up and over a paper-guide 39 and into a position directly underneath the cube of candy. The means for pinching and grasping the paper to prevent its backward movement is fully shown and described in my former patent and is in all respects the same as the mechanism shown in this application. The feed-lever 42 is the same and is provided at its outer end with devices which grip and operate the depending arm 46, all exactly like the mechanisms shown and described in my said patent, and which therefore need no further description or illustration herein. This feed-lever 42 is operated by means of an eccentric rod and strap 47 in engagement with an eccentric 48 on the main driving-shaft, so that during the rotations of the main driving-shaft the paper is fed into the desired position.

To provide means for forcing the candy cube into contact with the paper and into its proper holding-pocket, a vibrating plunger 49 is provided, as shown particularly in Fig. 6, and pivotally mounted at one end upon a bracket 50, secured to the upper end of one of the supporting-pillars. The free end of this vibrating plunger has a downwardly-projecting portion 51, that forms the plunger proper, directly over the cube of candy which has been cut, so that as the supplementary driving-shaft is rotated an eccentric-cam 52 thereon contacts such vibrating plunger and forces it downwardly to in turn force the cut-candy cube and paper into one of the holding-pockets of the rotatable head. A helical coil-spring 53 is provided and inserted between this vibratable plunger and a portion of the fixed frame of the machine, as shown particularly in Figs. 3 and 6, which acts to return the plunger in its upper movement.

It is desirable to provide means for sizing the cut cube of candy before it passes into engagement with the paper. To accomplish this result, a pair of U-shaped sizing-bars 54 is provided (see Figs. 6, 7, and 8) and slidingly mounted in guides 55 on the horizontal plate of the machine. These sizing-bars, as above stated, are substantially U-shaped when viewed in front elevation, as shown in Figs. 6 and 7, one upwardly-projecting arm acting as a stop to limit the inward motion of the same and the other projecting arm acting as a stop to limit the outward movement. Helically-coiled springs 56 are secured to the sliding sizing-bars and to a fixed portion of the machine, so as to hold such sizing-bars at their inner limit of motion and at the same time permit the action of the vibrating plunger 49 to force the cut-candy cube between them and give it the desired size for the purposes of storage or shipment.

When the rotatable head has been moved to the correct position to receive the cut cube of candy and end of the strip of paper in one of its holding-pockets, it is desirable to provide means for cutting the strip of paper at the desired point. To accomplish this, cutting mechanism is provided, formed of a fixed cutting-bar 57 and a vibrating cutting knife or bar 58, pivotally mounted adjacent thereto and so as to pass through the slots or grooves 60 in the rotatable head. The proper vibrating motion is given to this movable cutting-bar by means of an eccentric 59, mounted upon the supplementary driving-shaft, through the intermediary of its eccentric-strap 60 and the rod 61, which is connected to such vibrating cutter-bar, as shown particularly in Fig. 6.

It will thus be seen that as a rotary motion is imparted to the supplementary driving-shaft the vibrating cutting-bar is operated, as above described, to cut the paper at the desired time or times.

The forcing of the candy cube and strip of paper into its holding-pocket and the cutting of the strip of paper above described leave the packages in position for the folding operation, which is performed by mechanisms exactly similar to those shown and described in my former patent, as well as the means for ejecting the folded package from its engagement with the holding-head, to which patent reference may be had for fuller information as to details of construction.

The main driving-shaft is provided with a stepped driving-pulley 62, loosely mounted thereon and adapted to be thrown into and out of locked engagement with such shaft by means of a friction-clutch 63, through the intermediary of a shifting-lever 64, operated by a cam and lever 65 and 66, (shown particularly in Figs. 1 and 3;) but as these elements do not form any novel feature of this invention it is unnecessary to further show and describe them herein.

I claim—

1. In a machine of the class described, the combination of means for feeding a strip of candy into the machine, means for cutting it into cubes, a rotatable head for receiving the cut-candy cubes, a vibratable pivoted plunger for forcing the candy cubes into engagement with the rotatable head, means for vibrating the plunger, and sliding sizing-bars arranged between the plunger and the rotatable head to size the candy cubes, substantially as described.

2. In a machine of the class described, the combination of means for feeding a strip of candy into the machine, a rotating shaft provided with a candy-cutter mounted thereon in line with and directly over the strip of candy for cutting such strip into cubes, a rotatable head for receiving the candy cubes, a vibratable plunger pivoted to the frame of the machine for forcing the candy cubes into the rotatable head, a cam secured to the rotating shaft and contacting the vibratable plunger to move it in one direction, spring mechanism for moving such plunger in the other direction, and sliding sizing-bars arranged between the plunger and rotatable head to size the candy cubes, substantially as described.

3. In a machine of the class described, the combination of a pair of indented wheels for feeding a strip of candy into the machine, a main driving-shaft, a pair of supplementary feeding-rolls geared with the main driving-shaft to first engage and feed the candy strip into engagement with the indented feed-rolls, means for cutting the candy strip into cubes, a rotatable head for receiving the candy cubes, and means for forcing the candy cubes as they are cut into engagement with the rotatable head, substantially as described.

4. In a machine of the class described, the combination of a pair of indented feed wheels or rolls arranged to rotate in a horizontal plane for feeding a strip of candy into the machine, a second pair of feed-rolls arranged to rotate in a vertical plane for feeding the strip into engagement with the indented feed-rolls, means for cutting the candy strip into cubes, a rotatable head for receiving the candy cubes, and means for forcing the cubes of candy as they are cut into engagement with the rotatable head, substantially as described.

5. In a machine of the class described, the combination of a pair of feed-wheels arranged to rotate in a horizontal plane for feeding a strip of candy into the machine, means for imparting a step-by-step rotation to the same, a second pair of feed-wheels arranged to rotate in a vertical plane for feeding the candy strip into engagement with the first-named pair of feed-wheels, means for imparting a continuous rotation to the second pair of feed-rolls, means for cutting the strip into cubes, a rotatable head for receiving the candy cubes, and a vibratable plunger for forcing the candy cubes into the rotatable head, substantially as described.

6. In a machine of the class described, the combination of a pair of indented feed-wheels arranged to rotate in a horizontal plane for feeding a strip of candy into the machine, means for imparting a step-by-step rotation to such feed-rolls, a horizontal plane above and on which such feed-rolls rotate, a second pair of feed-rolls mounted on such plate to rotate in a vertical plane for feeding such candy strip into the first-named feed-rolls, a main driving-shaft, gear mechanism for imparting a continuous rotation from the main driving-shaft to the second pair of feed-rolls, a rotatable head arranged under the horizontal plate and rotating in a vertical plane in the path of and under the candy strip, a supplementary driving-shaft arranged at right angles to and geared with the main driving-shaft above the horizontal plate, a candy-cutter eccentrically secured to such supplementary driving-shaft to cut the candy strip into cubes, and a vibratable plunger pivoted to the frame of the machine and operated by the supplementary driving-shaft to force the cubes of candy as they are cut into the rotatable head, substantially as described.

7. In a machine of the class described, the combination of a pair of indented feed-wheels arranged to rotate in a horizontal plane for feeding a strip of candy into the machine, means for imparting a step-by-step rotation to such feed-rolls, a horizontal plane above and on which such feed-rolls rotate, a second pair of feed-rolls mounted on such plate to rotate in a vertical plane for feeding such candy strip into the first-named feed-rolls, a main driving-shaft, gear mechanism for imparting a continuous rotation from the main driving-shaft to the second pair of feed-rolls, a rotatable head arranged under the horizontal plate and rotating in a vertical plane in the path of and under the candy strip, a supplementary driving-shaft arranged at right angles to and geared with the main driving-shaft above the horizontal plate, a candy-cutter eccentrically secured to such supplementary driving-shaft to cut the candy strip into cubes, a vibratable plunger pivoted to the frame of the machine at right angles to the supplementary driving-shaft and between it and the horizontal plate, a cam on such supplementary driving-shaft to vibrate plunger downwardly and force the candy cubes as they are cut into the rotatable head, spring mechanism for vibrating the plunger upwardly, and a pair of slidable sizing-bars arranged between the plunger and the rotatable head to size the candy cubes, substantially as described.

8. In a machine of the class described, the combination of a pair of feed wheels or rolls arranged to rotate in a horizontal plane and feed a candy strip into the machine, a horizontal plate above which such rolls rotate, a pair of shafts for such rolls extending downwardly through such plates and provided with bevel-gears at their lower ends, a main driving-shaft, an intermediate operating-shaft arranged substantially in line therewith and provided with a pair of bevel-gears meshing with the gears on the feed-roll shaft, a ratchet-wheel on such intermediate shaft, pawl mechanism engaging such ratchet-wheel, a crank-plate on the main driving-shaft, and a rod on such crank-plate for vibrating and imparting a step-by-step rotation to the ratchet-wheel and thereby to the other parts, substantially as described.

9. In a machine of the class described, the combination of means for feeding a strip of candy into the machine, means for cutting it into cubes, a rotatable slotted head provided with a plurality of holding-pockets arranged to rotate in a vertical plane under and in line with the candy strip as it is fed into the machine, a driving-shaft arranged in line with and above such candy strip and provided with a cutter for cutting such strip into cubes, means for feeding a strip of paper into position above the rotatable holder and under the candy strip, a cutter for such paper comprising a fixed blade and a vibratable blade, eccentric mechanism on such driving-shaft connected with the vibratable cutter to vibrate the same through the slots in the rotatable head and cut the paper, and means for forcing the cubes of candy as they are cut with the paper into the holding-pockets of the rotatable head, substantially as described.

HARRY Y. ARMSTRONG.

Witnesses:
CHARLES W. LEHMANN,
HOMER KING.